Dec. 13, 1960  W. V. SPURLIN  2,964,182
BOWL FEEDER CUTOUTS

Filed Jan. 15, 1954  4 Sheets-Sheet 1

INVENTOR.
WILLIAM V. SPURLIN
BY
HIS ATTORNEY

Dec. 13, 1960 W. V. SPURLIN 2,964,182
BOWL FEEDER CUTOUTS
Filed Jan. 15, 1954 4 Sheets-Sheet 2

INVENTOR.
WILLIAM V. SPURLIN
BY
HIS ATTORNEY

Dec. 13, 1960 W. V. SPURLIN 2,964,182
BOWL FEEDER CUTOUTS
Filed Jan. 15, 1954 4 Sheets-Sheet 3

INVENTOR.
WILLIAM V. SPURLIN
BY
HIS ATTORNEY

Dec. 13, 1960 W. V. SPURLIN 2,964,182
BOWL FEEDER CUTOUTS
Filed Jan. 15, 1954 4 Sheets-Sheet 4

INVENTOR.
WILLIAM V. SPURLIN
BY
HIS ATTORNEY

United States Patent Office 2,964,182
Patented Dec. 13, 1960

2,964,182

BOWL FEEDER CUTOUTS

William V. Spurlin, Indiana, Pa., assignor to Syntron Company, Homer City, Pa., a corporation of Delaware Filed Jan. 15, 1954, Ser. No. 404,221

4 Claims. (Cl. 209—90)

This invention relates generally to material handling devices such as conveyer feeder bowls and more particularly to an article handling device wherein the articles are fed along a track supported by the bowl and are oriented in a predetermined position for delivery, which position may be other than the manner in which the article in conveyed along the track.

When assembling parts in production or handling parts for similar jobs it is frequently desirable to supply one or more series of articles to a common work station. Each article is fed in turn and oriented to a definite or predetermined position owing to the actual shape of the article. However, the article itself is frequently not adapted for conveying in the manner in which it is desired to be delivered for use in the manufacturing step or assembly program. In such instances it is preferable to employ an article feeding bowl for holding a quantity of articles which are picked up and conveyed along the helical conveyer track in a manner which is most suitable to efficiently convey that particular article, and before the article is to be delivered from the bowl for use it is oriented by a special section track or by projections or abutments arranged to position the articles so they will be readily adaptable for use when delivered from the bowl.

Each of these feeder bowls is mounted on a frame that is supported for vibratory reciprocation as a free body in an inclined path that is arcuate relative to a vertical central axis. These flexible members permit this reciprocatory movement and they may be constructed from elastomer members, metal springs or torsion bars. These flexible members are in turn mounted on a base that is massive relative to the mass of the frame including the loaded bowl. This base is supported on resilient pads or feet as it must vibrate but not as violently as the lighter mass of the frame and bowl that must feed the articles along the track.

The vibrating mass of the frame, bowl and load it carries has to be tuned to reciprocate within a few cycles more or less of the frequency of the driving impulses so that the tuned mass will synchronize with driving impulses. These impulses may be obtained mechanically or electromagnetically. The direction of the force of the impulse may be axial, tangential or along the path of reciprocation. They must be balanced relative to the central axis around which the bowl and frame reciprocate in their inclined arcuate path of movement.

The feeder bowls comprising this invention are provided with helical or spiral track that rises from the bottom of the bowl and winds up around on the inside wall of the bowl to the rim where the track passes through the wall to deliver the articles. The articles are delivered in turn or single file and most generally they are required to be oriented to a given position as they are delivered. The articles themselves may have an odd shape or they may have a tip or stem that requires that they be conveyed in one position and they may require reorientation to another when delivered.

The articles may be capable of being conveyed along the track in several different ways such as right side up, upside down, on either side or end, yet when they are delivered they must be right side up. Different forms of correctors are employed to properly reorient these articles. The wiper is one form of correction that extends across the track. The profile selector is another form of correction that permits only those articles properly oriented to pass. The inwardly sloping track working with a fence is another form of correction. The bridges that convey only those articles properly placed thereon represent another form. The cut outs are another form which are openings in the track to permit overbalanced or improperly oriented articles to fall back into the bowl and only those properly oriented to pass on to the discharge. This application deals with the cutout type of selection of articles fed from a feeder bowl.

The cutout section is a piece removed from the bottom of the track and along the inner edge thereof. These cutouts are merely a hole along one edge of the track which is designed accurately to overbalance the improperly oriented piece or article and allow it to return to the bottom of the bowl. If the bowl feeder cannot deliver enough pieces in an alloted time due to the cutout rejects, then the track is doubled or tripled to increase the delivery.

These cutouts may cooperate with other elements of correction or article orientation to aid in properly selecting the articles being conveyed. A wiper, fence, bridge or sloping track may be employed with the cutout to work out the problem of proper orientation of the articles.

The feeder bowl vibrations cause the articles to travel in circular paths. The centrifugal force has no effect on the articles as they travel upwardly around the track. When the cutout is in the inner edge of the track, the articles properly oriented may have some part overhanging the cutout and travel thereover. These cutouts have many applications alone and with other orienting means. Their application may be just as numerous as the different articles employed.

The tracks of these feeder bowls are smooth. They may be sloped toward the wall of the bowl or toward the center or be flat in accordance with the advantage desired. The smooth track with the vibratory action smoothly feeds the parts from the bowl up around the track. This slight vibratory action is necessary to the functioning of the selecting parts whether they are wipers, cutouts, bridges or windows. This vibration functions to make the parts sensitive to selection and balance.

Other objects and advantages appear hereinafter in the following description and claims.

The accompanying drawings show, for the purpose of exemplification without limiting the invention or claims thereto, certain practical embodiments illustrating the principles of the invention wherein:

Figure 2:
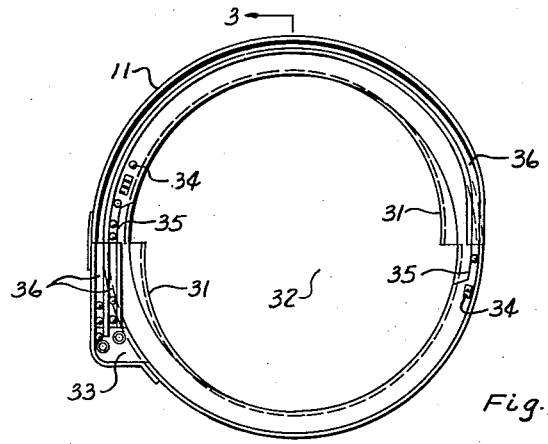
Fig. 2 is a plan view of a second feeder bowl having two tracks that deliver the articles at the same position and are provided with cutouts.

Referring to the drawings, the reciprocating vibratory motor comprises the massive base 1 which is preferably a casting supported by the resilient feet 2 and carries the outer casing 3 that encloses the motor and the control parts therefor.

The base 1 is provided with a plurality of sloping seats 4 uniformly disposed about the vertical central axis indicated by the construction line 5. As shown these seats support the lower ends of the tuned spring means such as the leaf spring means 6. The upper ends of these leaf springs are secured to corresponding seats 7 formed on the frame 8. This frame member is provided with openings to receive the mounting bolts 10 for securing the bowl 11 to the frame.

The motor illustrated is of the electromagnetic type and comprises the core member 12 mounted on the bracket 13 that is adjustably supported on the top of the base 1 by the mounting bolts 14. The core is in the shape of a C and has a coil 15 on each leg. The armature 16 is secured to the underside of the frame 8 and extends over each of the pole faces of the core member 12. By properly mounting the core 12 and the armature 16 relative to the central axis 5 each energy impulse of the motor produces a downward axial pull, causing the springs 6 to flex and move the frame in an inclined arcuate path of movement. When the energy impulse passes the springs permit the frame to raise to a position beyond its normal position.

By tuning the springs 6 to reciprocate the frame at a frequency of a few cycles more or less than the frequency of the driving energy impulses, the vibratory system will follow in synchronism with the frequency of the energy impulses and the best operation of this reciprocating vibratory device will be obtained.

If the armature is made of permanent magnet material the frame will reciprocate in synchronism with the energy impulses which would be any suitable source of alternating current. If the armature is made of laminate steel the field would reciprocate at a rate equal to twice the frequency of the alternating current as each cycle has two current impulses. The springs 6 should of course be tuned to within a few cycles of the frequency that the device is to reciprocate. A half wave rectifier such as shown at 17 can be employed to reduce the number of current impulses to that of the frequency which then causes the armature and the parts attached thereto to reciprocate.

The magnitude of the current impulses may be controlled by a simple rheostat as shown at 18. The coil 15, the half wave rectifier 17, and rheostat 18 are connected in series across a source of alternating current.

Figure 1:
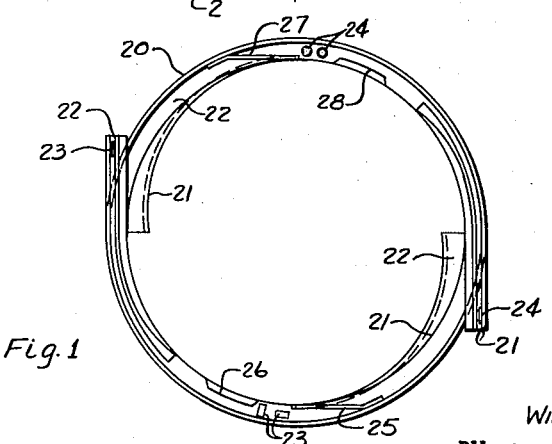
Fig. 1 is a plan view of a feeder bowl having two tracks spaced 180° apart and each provided with cutouts.

Referring specifically to the feeder bowl cutouts the bowl structure 20 of Fig. 1 has a dual helical track 21 and 22. The track 21 is constructed to convey small rectangular flat plates 23 which may pile up and tumble over each other as the vibratory action takes them from the bowl whether they come onto the track at the bottom of the bowl or part way up the side.

The track 22 is constructed to feed the cap 24, as illustrated, with a small flat projection on the outer side as shown in Fig. 1. Each track for its greatest length is sufficiently wide to take the flat plate 23 or the cap 24. The track 21 has the selector wiper 25 that is spaced above the track sufficiently to allow the flat plates to move thereunder at only single thickness, but scrapes off the caps 24 and any piled up plates 23. The next selector on track 21 is the cutout 26 which allows the plates 23 to travel past if they are longitudinally aligned, but if in any way transverse, they will tumble back into the bowl.

Track 22 has the wiper 27 that is spaced above the track sufficiently to allow only one cap 24 to travel thereunder so the excess tumbles back into the bowl. The cutout 28 will allow the caps 24 with their stems down to pass, but if the stems are up they fall back into the bowl. The cutout 28 is too narrow to allow the plates to pass at all so they are all rejected back into the bowl.

Figure 3:
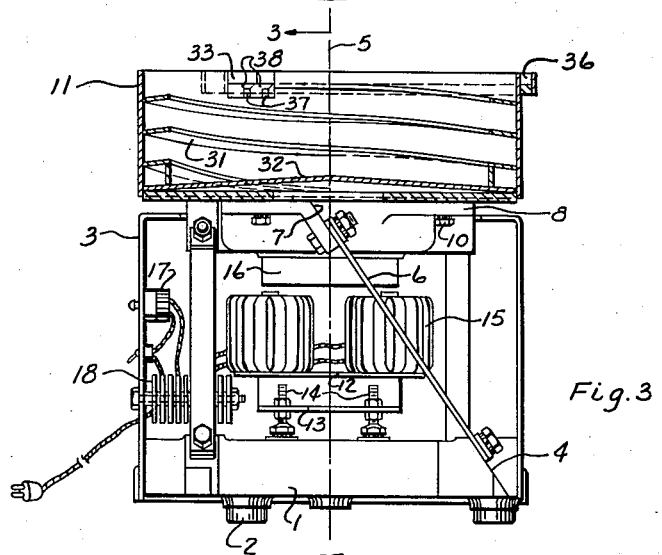
Fig. 3 is a view in vertical section taken on the line 3—3 of Fig. 2.

Referring to Figs. 2 and 3 the bowl 11 has the dual tracks 31 which start at 180° from each other on the conical bottom 32 of the bowl and travel to the same point of discharge indicated by the shelf 33 on the side of the bowl. This bowl feeds the little round cylinders 34 which are just about as round as they are long. If these cylinders are lying down when they reach the cutout 35 they fall back into the bowl, but if they are upright they pass the cutout and feed through the upwardly open channels 36 to the platform 33 which has two holes 37 that are countersunk as shown at 38. The upright cylinders will fall through the holes 37 to discharge. If by chance a cylinder falls down it cannot pass through the hole as it is too big in its longitudinal dimension.

Figure 4:
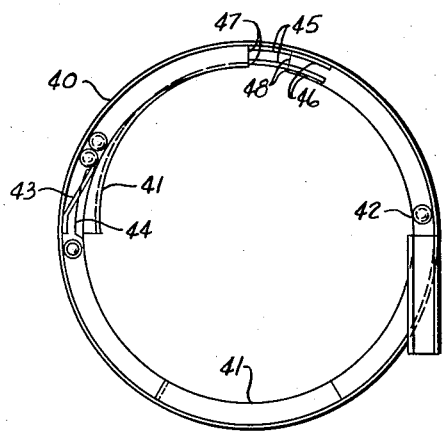
Fig. 4 is a plan view of a feeder bowl having a single track with a cutout operating in conjunction with a wiper.

Referring to Fig. 4 the bowl 40 has a single helical track 41 to feed articles having flanges such as the metal washer or cap 42 which are substantially as wide as the track as shown. These caps may pile and lean upon each other as they start around the track and being higher than a single cap the wiper abutment 43 scrapes off the excess tumbling them back into the bowl. Thus only a single line passes the wiper and these may be only right side up as the cutout 44 which operates in conjunction with the wiper will permit only those with the stems or small diameter up or down to pass along under the wiper. Here the wiper operates in conjunction with the cutout. If the stems of the caps are up or down they can pass the cutout without falling back. However, the spaced rails 45 are secured to the track as indicated at 46 and there is a cutout or gap in the whole of the track from 47 to 48. Thus the free ends of the rails are spaced above the adjacent end of the track and if the caps are stem up they pass under the rails 45 to the cutout 47 and back into the bowl. If on the other hand they are stems down, they will be fed over the bridge formed by the rails 45 and pass on to discharge.

Figure 5:
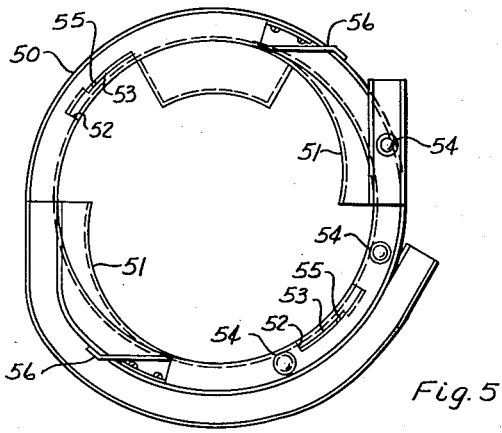
Fig. 5 is a plan view of a feeder bowl having a dual track each having a riser operating in conjunction with a cutout.
Figure 6:
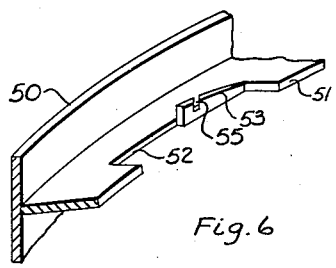
Fig. 6 is a detailed perspective view of the ejector shown in Fig. 5.

Referring to Figs. 5 and 6 the bowl 50 has a dual track 51 starting at 180° from each other and discharging adjacent to each other as shown. This track is provided with a cutout 52, a portion of which has an inclined rail 53 on which the deep plastic cup 54 must ride as it leans against the wall of the bowl. By tilting the cup in this manner it comes back down on the track with a bang and if the flange of the cup is up the partially rounded bottom of the cup supports it on the track 51 regardless of the cutout 52. But if the cup flanges are down the cup just keeps on rolling and drops back into the bowl. Thus the slight weight of the cup bottom when inverted is sufficient to overbalance the part and reject the same. If the rim is facing up, the cup bottom is down and close to the track thus not permitting the cup to swing off into the bowl. A notch 55 is in the rail 53 to bump the cup if the flange is down and start it to roll forward as it falls off the end of the rail. The wiper 56 functions to prevent stacked cups from passing.

Figure 7:
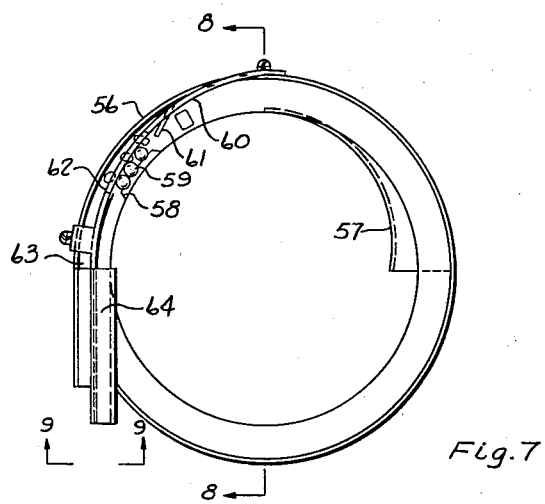
Fig. 7 is a plan view of a feeder bowl having a single track having a track restricting and article selecting wall.
Figure 9:
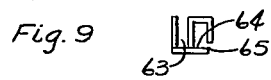
Fig. 9 is a view taken on the line 9—9 of Fig. 7.
Figure 8:
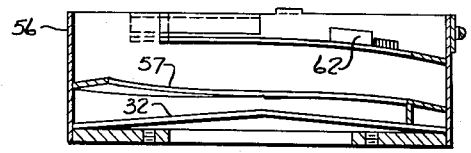
Fig. 8 is a view taken on the line 8—8 of Fig. 7.

Referring to Figs. 7, 8 and 9 the feeder bowl 56 has the single helical track 57 which is provided with the cutout 58. This bowl is constructed to feed pellets or pills 59. The pills are friable and as they are conveyed upwardly around the track, the wall 60 comes through the bowl wall and extends over approximately half of the track to restrict the same to a single line of pills 59. A short tongue 61 is struck out from the wall 60 to move the pills closer to the inner edge of the track so they are closer to the cutout and have sharper path deviation to and from the free end of the projection 61. A window 62 is in the bottom of the wall 60 and permits short or broken pills to travel therethrough to the track 63 where they are discharged at a different place than the pills properly oriented which when properly oriented pass the cutout 58 and travel on to the discharge chute 64. The chutes 63 and 64 are shown in Fig. 9 and the latter is constructed as a square tube with an open slot 65 in the bottom. The slot 65 permits the small broken pieces of pills to escape and not be carried on by the properly oriented and whole pills 59.

Figure 10:
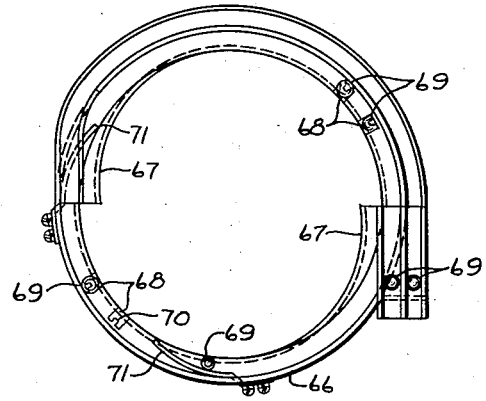
Fig. 10 is a plan view of a feeder bowl having dual track with a profile cutout.

In Fig. 10 the bowl 66 has a dual track 67 which discharges at the same position and each track is provided with a plurality of cutouts 68 which are profile cutouts that approximate the shape of the article which is the small metal cup 69. If the cup is opened upwardly it will pass over these cutouts 68. If the cup is opened down the center projection 70 is not long enough to support the rim of the cup and it tumbles down into the bowl. A wiper 71 is employed to kick off any cups that are stacked or rolling on their sides by being pushed by cups with their axis vertical.

Figure 11:
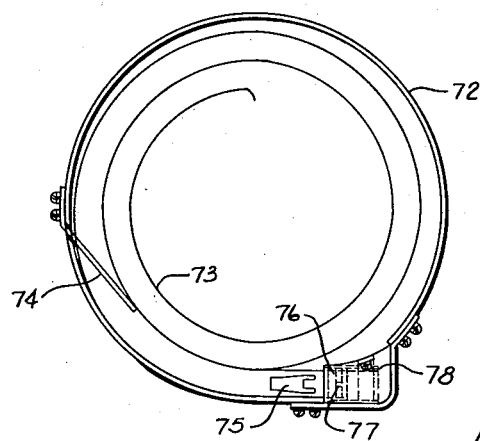
Fig. 11 is a plan view of a feeder bowl having a single spiral track with a profile cutout at the end of the track.
Figure 12:
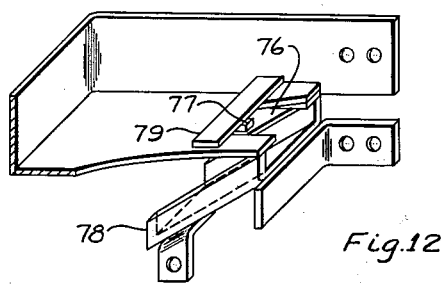
Fig. 12 is a detailed perspective view of the cutout shown in Fig. 11.

Another type of profile cutout is shown in Figs. 11 and 12 wherein the feeder bowl 72 has a single spiral track 73 and an ordinary wiper 74 spaced above the track to wipe off any parts that are stacked above each other. The parts are elongated zipper pulls 75 having a bifurcated end. It is desired to have these parts fed with their bifurcated ends at the front. A cutout 76, somewhat larger than the bifurcated end, is provided with a middle prong 77 which extends between the bifurcated head of the zipper pull. When this part 75 is properly oriented the bifurcated end is fed over the cutout 76 until it is about to strike the end of the cutout or the tip of the center prong 77. At this time the bifurcated portion overweighs the tail of the pull and it teeters down causing the pull to be discharged through the chute 78. With or without the bar 79 the pull with the stem forward will travel over or to the inside of the cutout 76 and drop back into the bowl to try again. Thus this profile selection by the use of a cutout properly admits the desired piece in place of rejecting, and the improperly oriented piece passes over or to one side of the cutout and back into the bowl.

Figure 13:
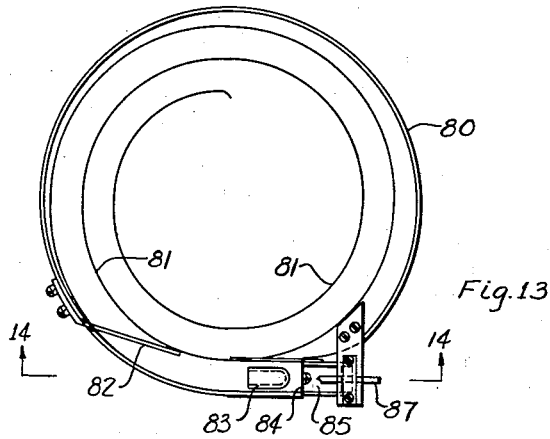
Fig. 13 is a plan view of a feeder bowl having a single spiral track with a profile invertor cutout at the end of the track.
Figure 14:
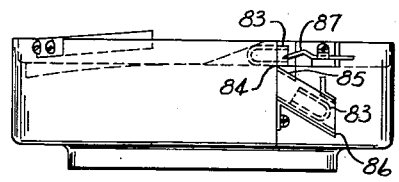
Fig. 14 is a sectional view taken along the line 14—14 of Fig. 13.

Referring to Figs. 13 and 14 the feeder bowl 80 is provided with a single spiral track 81 which has the wiper 82 to knock off the tube parts 83 which are standing up or piled on one another. As long as the tube parts 83 are lying down they are fed to the discharge. These tube parts 83 are closed at one end and it is desired that they be delivered with the closed end foremost. If the closed end is foremost, its weight causes it to teeter on the edge 84 of the cutout 85 and fall forward down the chute 86. If the open end comes up the track foremost, its end is not heavy enough to cause the tube to teeter on the corner 84 so it travels further over the cutout 85 until its open end extends over the projecting finger 87. The tube rides up this finger until its closed end is fed free of the corner 84 at which time the closed end swings downwardly and strikes the chute causing the closed end to be fed forwardly to discharge.

Here the orienting means causes all the parts to be fed properly, as long as they pass the wiper.

I claim:

1. An article selector for a feeder bowl having a bottom with an upstanding annular wall the inner side of which carries an inclined track the surface of which slopes towards said wall, said track extending from the bottom of the bowl upwardly to deliver articles in turn when the bowl is supported on a motor means including springy means to support said feeder bowl for reciprocation in an inclined arcuate path when energized by energy impulses to vibrate the articles in a positive conveying action up the track, means defining a cutout in said track, characterized in that said cutout is along the inner edge of said track, and an upstanding inclined rail along the edge of said cutout in said track, said rail ending abruptly before the end of said cutout.

2. An article selector for a feeder bowl having a bottom with an upstanding annular wall the inner side of which carries an inclined track extending from the bottom of the bowl upwardly to deliver articles in turn when the bowl is supported on a motor means including springy means to support said feeder bowl for reciprocation in an inclined arcuate path when energized by energy impulses to vibrate the articles in a positive conveying action up the track, means defining a cutout in said track, characterized in that said cutout is along the inner edge of said track, an abutment projecting above said track and operating to direct and move the vibrating articles relative to said means defining a cutout to selectively return improperly oriented articles, said abutment provided in the form of a vertical wall extending over said track and including means defining an opening in said wall adjacent said cutout to receive articles smaller than those properly oriented and selected for delivery.

3. An article selector for a feeder bowl having a bottom with an upstanding annular wall the inner side of which carries an inclined track extending from the bottom of the bowl upwardly to deliver articles in turn when the bowl is supported on a motor means including springy means to support said feeder bowl for reciprocation in an inclined arcuate path when energized by energy impulses to vibrate the articles in a positive conveying action up the track, means defining a cutout in said track, characterized by a chute extending from said cutout to discharge, said cutout lying wholly within the boundary of said track and flush with the surfaces thereof and of the general profile of the article being conveyed, the leading edge of said cutout requiring the article to overbalance and pass downwardly through said cutout to said chute, and an abutment projecting over the surface of said track and cutout to move improperly oriented articles back into said bowl.

4. An article selector for a feeder bowl having a bottom with an upstanding annular wall the inner side of which carries inclined track means extending from the bottom of the bowl upwardly to deliver articles in turn when the bowl is supported on a motor means including springy means to support said feeder bowl for reciprocation in an inclined arcuate path when energized by energy impulses to vibrate the articles in a positive conveying action up the track means, characterized in that said track means includes at least two conveyor tracks, means defining a separate cutout through the surface of each of said conveyor tracks, the cutout in one of said tracks to allow all but one properly oriented and selected class of articles to pass therethrough and back into the bowl, the cutout of another of said tracks to allow all but another properly oriented and selected class of articles to pass therethrough and back into the bowl so as to selectively feed different articles from each of said tracks.

(References on following page)

References Cited in the file of this patent

UNITED STATES PATENTS

| Number | Name | Date |
|---|---|---|
| 365,440 | Keith | June 28, 1887 |
| 635,588 | Pondorf | Oct. 24, 1899 |
| 1,336,771 | Bammer | Apr. 13, 1920 |
| 1,908,855 | Makenny | May 16, 1933 |
| 2,501,403 | McKinsey | Mar. 21, 1950 |
| 2,529,603 | Galt | Nov. 14, 1950 |
| 2,549,322 | McKinsey | Apr. 17, 1951 |
| 2,609,914 | Balsiger | Sept. 9, 1952 |
| 2,661,833 | Spurlin | Dec. 8, 1953 |
| 2,665,005 | Mundy | Jan. 5, 1954 |
| 2,696,292 | Spurlin | Dec. 7, 1954 |
| 2,701,637 | Rundt | Feb. 8, 1955 |
| 2,718,957 | Spurlin | Sept. 27, 1955 |
| 2,725,971 | Clark-Riede | Dec. 6, 1955 |
| 2,799,383 | Spurlin | July 16, 1957 |
| 2,807,350 | Rayburn et al | Sept. 24, 1957 |

FOREIGN PATENTS

| Number | Country | Date |
|---|---|---|
| 170,627 | France | Aug. 13, 1885 |
| 209,824 | Great Britain | Jan. 17, 1924 |
| 697,433 | Great Britain | Sept. 23, 1953 |